United States Patent [19]

Mizumoto et al.

[11] Patent Number: 4,904,547
[45] Date of Patent: Feb. 27, 1990

[54] FUEL-CELL DEVICE

[75] Inventors: Yoichi Mizumoto; Kunihiro Doi, both of Kobe, Japan

[73] Assignee: Mitsubishi Denki Kabushiki Kaisha, Japan

[21] Appl. No.: 827,538

[22] Filed: Feb. 10, 1986

[30] Foreign Application Priority Data

Mar. 1, 1985 [JP] Japan .................. 60-41442

[51] Int. Cl.$^4$ ............................................. H01M 8/04
[52] U.S. Cl. ....................................... 429/22; 429/25; 429/34
[58] Field of Search .......................... 429/22, 25, 34

[56] References Cited

U.S. PATENT DOCUMENTS

| 4,015,052 | 3/1977 | Cheron | 429/25 X |
| 4,226,919 | 10/1980 | Stüwe | 429/25 |

FOREIGN PATENT DOCUMENTS

| 57-50774 | 3/1982 | Japan | 429/25 |
| 58-166669 | 10/1983 | Japan | 429/25 |
| 59-75569 | 4/1984 | Japan | |

Primary Examiner—Stephen J. Kalafut
Attorney, Agent, or Firm—Leydig, Voit & Mayer

[57] ABSTRACT

A fuel-cell device according to this invention comprises switching valves which open at the time of the urgent stop of the device or the suspension of electric power and which are arranged outside a cell vessel, first and second differential pressure detectors which detect the differential pressures of an excess fuel pressure and an excess air pressure with respect to a nitrogen pressure in the cell vessel respectively, and first and second pressure controllers which control the opening and closing operations of a fuel differential pressure control valve and an air differential pressure control valve in response to the outputs of the first and second differential pressure detectors respectively.

1 Claim, 1 Drawing Sheet

FUEL-CELL DEVICE

BACKGROUND OF THE INVENTION

This invention relates to a fuel-cell device which is permitted to stop by promptly replacing a fuel gas and air with nitrogen gas at the time of the urgent stop of the device or the suspension of electric power, without affording a great differential pressure fluctuation between the fuel gas and air of a fuel cell stack.

A prior-art device of the pertinent type is, for example, a fuel-cell device which is disclosed in the official gazette of Japanese Patent Application Laid-open No. 58-163182 and the arrangement of which is shown in FIG. 1. Referring to the figure, numeral 1 designates a cell vessel which receives therein a fuel cell stack 2 furnished with inlet and outlet manifolds for fuel and air. A fuel flow control valve 3 serves to supply the fuel to the fuel cell stack 2, while a fuel differential pressure control valve 4 is disposed on the excess fuel outlet side of the fuel cell stack 2. An air flow control valve 5 supplies the air, while an air differential pressure control valve 6 is disposed on the excess air outlet side of the fuel cell stack 2. A nitrogen flow control valve 7 supplies nitrogen to the cell vessel 1, while a case nitrogen pressure control valve 8 controls a nitrogen pressure in the cell vessel 1. Numerals 9 and 10 indicate switching valves, such as magnet valves, which are disposed in the vessel 1.

Next, the operation of the prior-art fuel-cell device will be described. The fuel flows into the fuel cell stack 2 via the fuel flow control valve 3, and it reacts in the cell portion to become excess fuel, which egresses from the fuel differential pressure control valve 4. On the other hand, the air flows into the fuel cell stack 2 via the air flow control valve 5 and has oxygen consumed in the cell portion, whereupon the resulting excess air egresses from the air differential pressure control valve 6. The nitrogen flows into the cell vessel 1 receiving the fuel cell stack 2 therein via the nitrogen flow control valve 7, and it egresses from the nitrogen pressure control valve 8 located on the outlet side of the cell vessel 1. A cell operating pressure is set by the nitrogen pressure control valve 8. An air pressure in the fuel cell stack 2 is set somewhat lower than a nitrogen pressure in the cell vessel 1, and a fuel pressure in the same is set still somewhat lower than the air pressure, thereby to prevent the contact reaction between the fuel and the air.

During the operation of the fuel cell, the switching valves 9 and 10 arranged in the cell vessel 1 are held closed. When stopping the fuel cell, the switching valves 9 and 10 are first opened, and the fuel flow control valve 3 and the air flow control valve 5 are subsequently closed. After the inner atmosphere of the fuel cell stack 2 is replaced with nitrogen, the fuel differential pressure control valve 4 and the air differential pressure control valve 6 having been fully open are closed. Lastly, the nitrogen flow control valve 7 and the nitrogen pressure control valve 8 are controlled to lower the pressure in the cell vessel 1 down to the normal pressure.

When starting the fuel cell, the fuel cell stack 2 is supplied with the fuel and the air in the order reverse to that for the stop so as to generate electric power.

The prior-art fuel-cell device is constructed as described above. Therefore, when the fuel cell is to be stopped urgently, the nitrogen pressure in the cell vessel 1 needs to be held at a fixed value while the fuel and air lines are subjected to the nitrogen replacement, so that the nitrogen flow control valve 7 of wide flow control range is necessitated. In addition, when electric power has suspended, the nitrogen flow control valve 7 is held in the state of replacing the fuel and the air with the nitrogen (the open state), so that a master valve for supplying the nitrogen gas needs to be closed after a fixed period of time (after the interior of the cell has been replaced with nitrogen).

Moreover, the provision of the switching valves 9 and 10 in the cell vessel 1 is inconvenient for maintenance.

SUMMARY OF THE INVENTION

This invention has been made in order to solve the problems as described above, and has for its object to provide a fuel-cell device which can readily start and stop.

A fuel-cell device according to this invention comprises switching valves which open at the time of the urgent stop of the device or the suspension of electric power and which are arranged outside a cell vessel, first and second differential pressure detectors which detect the differential pressures of an excess fuel pressure and an excess air pressure with respect to a nitrogen pressure in the cell vessel respectively, and first and second pressure controllers which control the opening and closing operations of a fuel differential pressure control valve and an air differential pressure control valve in response to the outputs of the first and second differential pressure detectors respectively.

BRIEF DESCRIPTION OF THE DRAWINGS

In the drawings, the same symbols indicate identical or corresponding portions.

DESCRIPTION OF THE PREFERRED EMBODIMENT

Figure 1:
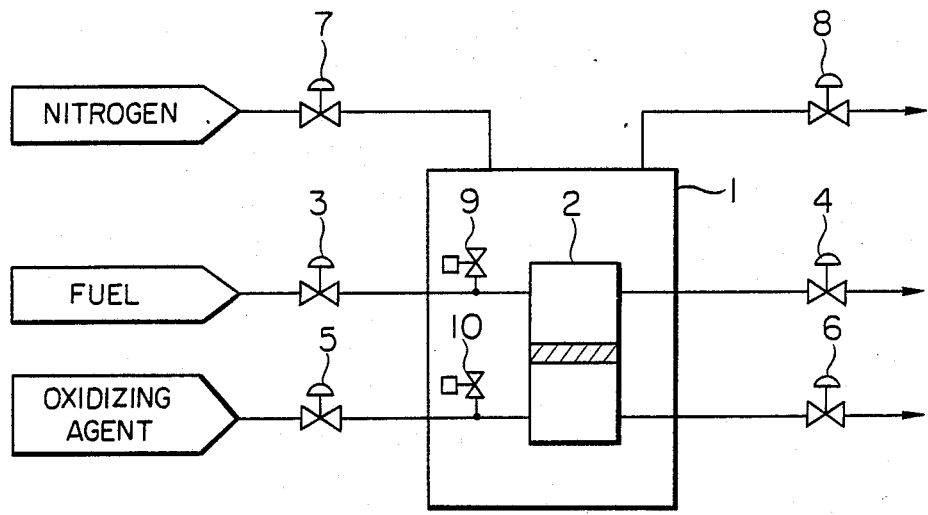
FIG. 1 is a flow diagram of a prior-art fuel-cell device.
Figure 2:
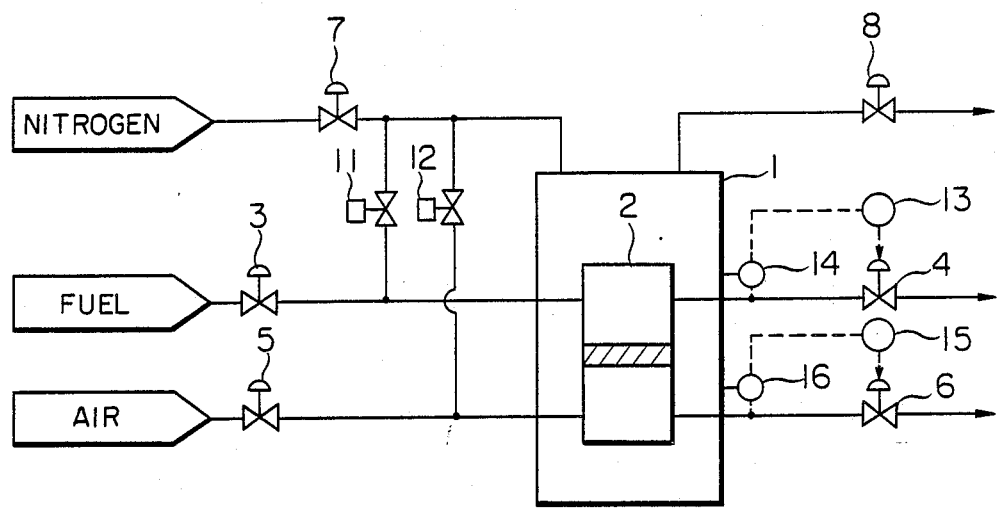
FIG. 2 is a flow diagram of a fuel-cell device showing an embodiment of this invention.

Now, one embodiment of this invention will be described with reference to the drawing. In FIG. 2, numeral 7 designates a nitrogen flow control valve which closes at the time of the urgent stop of a fuel cell or the suspension of electric power. A switching valve 11 connects a nitrogen pipe and a fuel pipe and is installed outside a cell vessel 1, while a switching valve 12 connects the nitrogen pipe and an air pipe and is installed outside the cell vessel 1. Numerals 13 indicates a first pressure controller, which applies a set signal to a fuel differential pressure control valve 4 upon receiving a signal from a first differential pressure detector 14 for detecting the differential pressure between a nitrogen pressure in the cell vessel 1 and an excess fuel pressure. Numeral 15 indicates a second pressure controller, which applies a set signal to an air differential pressure control valve 6 upon receiving a signal from a second differential pressure detector 16 for detecting the differential pressure between the nitrogen pressure in the cell vessel 1 and an excess air pressure.

Next, the operation of the fuel-cell device according to this invention will be described.

Fuel is supplied from a fuel flow control valve 3 to a fuel cell stack 2, and it reacts with air supplied from an air flow control valve 5, with an electrolyte held therebetween. Owing to this reaction, D.C. power is generated, and the fuel and air become excess fuel and excess air which egress from the differential pressure control valves 4 and 6, respectively. The reaction pressures of the fuel and the air are respectively adjusted by controlling the differential pressure control valves 4 and 6 by means of the corresponding pressure controllers 14 and 16 which have received the signals from the differential pressure detectors 13 and 15. In addition, the nitrogen pressure in the cell vessel 1 serving as the reference of the reaction pressures is adjusted by the nitrogen flow control valve 7 and a nitrogen pressure control valve 8. During the operation of the fuel cell, the switching valves 11 and 12 are held closed. When stopping the fuel cell urgently, the nitrogen flow control valve 7, nitrogen pressure control valve 8, fuel flow control valve 3 and air flow control valve 5 are closed, and the switching valves 11 and 12 are subsequently opened. Owing to the opening of the switching valves 11 and 12, the nitrogen staying in the cell vessel 1 flows into the fuel cell stack 2 and causes the fuel and air in the fuel cell stack 2 to flow out of the differential pressure control valves 4 and 6 respectively, whereby the nitrogen replacement of fuel and air lines is performed. On this occasion, the nitrogen pressure in the cell vessel 1 lowers naturally. Consequently, the differential pressures of the excess fuel pressure and the excess air pressure with respect to the nitrogen pressure in the cell vessel 1 fluctuate. The differential pressure fluctuations are respectively detected by the first and second differential pressure detectors 14 and 16, and the first and second pressure controllers 13 and 15 respond to the detection signals and control the opening degrees of the differential pressure control valves 4 and 6 so as to cancel the differential pressure fluctuations respectively. As described above, the pressures of the respective lines naturally lower to the normal pressure, and the staying nitrogen in the cell vessel 1 is effectively utilized, so that the fuel cell can be stopped in a short time with a smaller amount of nitrogen and more easily.

Further, when electric power has suspended, the opening degrees of the differential control valves 4 and 6 are maintained, whereby the fuel and air of the fuel cell vessel 1 can be replaced with the nitrogen substantially in the same manner as in the case of stopping the fuel cell.

Here, the nitrogen pressure control valve 8 employed has been the valve which closes at the time of the urgent stop and the suspension of electric power. It is also allowed, however, to employ a nitrogen pressure control valve which opens at the time of the urgent stop and the suspension of electric power and to incorporate between the cell vessel 1 and the nitrogen pressure control valve 8 a shut-off valve which opens during the ordinary operation and which closes at the time of the urgent stop and the suspension of electric power.

As described above, according to this invention, at the time of the urgent stop of a fuel cell or the suspension of electric power, switching valves arranged outside a cell vessel and a fuel differential pressure control valve as well as an air differential pressure control valve are opened, and fuel, air and nitrogen flow control valves and a nitrogen pressure control valve are closed, thereby to perform nitrogen replacement by the use of nitrogen staying in the cell vessel. This brings forth the effect that the fuel-cell device can be readily started and stopped with a lower nitrogen consumption in a short time.

What is claimed is:

1. An apparatus for producing electricity through an electrochemical reaction comprising a fuel cell stack having fuel inlet and outlet manifolds and air inlet and outlet manifolds; a cell vessel containing the fuel cell stack therein; a fuel supply portion including a fuel flow control valve connected to the fuel inlet manifold through a pipe; an excess fuel discharge portion including a fuel differential pressure control valve connected to the fuel outlet manifold through a pipe; an air supply portion including an air flow control valve connected to the air inlet manifold through a pipe; an excess air discharge portion including an air differential pressure control valve connected to the air outlet manifoid through a pipe; a nitrogen supply portion including a nitrogen flow control valve connected with the cell vessel through a pipe; a nitrogen discharge portion including a nitrogen pressure control valve connected with the cell vessel through a pipe; switching valve means disposed outside of said cell vessel and downstream from the respective flow control valves for connecting said fuel supply portion and said air supply portion to said nitrogen supply portion, said switching valve means being opened at the time when said apparatus is to be stopped; a first differential pressure detector for detecting a differential pressure between a nitrogen pressure in said cell vessel and an excess fuel pressure of said excess fuel discharge portion; a first pressure controller for controlling an opening and closing operation of said fuel differential pressure control valve in response to the output of said first differential pressure detector; a second differential pressure detector for detecting a differential pressure between the nitrogen pressure in said cell vessel and an excess air pressure of said excess air discharge portion; and a second pressure controller for controlling an opening and closing operation of said air differential pressure control valve in response to the output of said second differential pressure detector, wherein when said apparatus is to be stopped, said nitrogen flow control valve, said nitrogen pressure control valve, said fuel flow control valve and said air flow control valve are closed, said switching valve means is opened, said fuel differential pressure control valve and said air differential pressure control valve are open, thereby subjecting fuel and air lines to nitrogen replacement by the nitrogen in said cell vessel.

* * * * *

UNITED STATES PATENT AND TRADEMARK OFFICE
CERTIFICATE OF CORRECTION

PATENT NO. : 4,904,547
DATED : February 27, 1990
INVENTOR(S) : Mizumoto et al

It is certified that error appears in the above-identified patent and that said Letters Patent is hereby corrected as shown below:

Please insert the following references which were omitted from the face of the patent.

References Cited

Under "U.S. PATENT DOCUMENTS" insert

--4,098,960   7/1978   Gagnon...........429/25--;

Under "FOREIGN PATENT DOCUMENTS" insert

--58-163182   9/1983   Japan--; and
--59-42782    3/1984   Japan--.

Signed and Sealed this

Second Day of April, 1991

Attest:

HARRY F. MANBECK, JR.

*Attesting Officer*  *Commissioner of Patents and Trademarks*